(12) United States Patent
Zheng et al.

(10) Patent No.: US 12,228,786 B2
(45) Date of Patent: Feb. 18, 2025

(54) OPTICAL LENS, IMAGING MODULE AND ASSEMBLY METHOD THEREOF

(71) Applicant: NINGBO SUNNY OPOTECH CO., LTD., Yuyao (CN)

(72) Inventors: Chengchang Zheng, Yuyao (CN); Enlai Xiang, Yuyao (CN); Kailun Zhou, Yuyao (CN)

(73) Assignee: NINGBO SUNNY OPOTECH CO., LTD., Yuyao (CN)

( * ) Notice: Subject to any disclaimer, the term of this patent is extended or adjusted under 35 U.S.C. 154(b) by 1037 days.

(21) Appl. No.: 17/180,220

(22) Filed: Feb. 19, 2021

(65) Prior Publication Data

US 2021/0173170 A1 Jun. 10, 2021

Related U.S. Application Data

(63) Continuation of application No. PCT/CN2019/098180, filed on Jul. 29, 2019.

(30) Foreign Application Priority Data

Aug. 21, 2018 (CN) .......................... 201810953772.5
Oct. 12, 2018 (CN) .......................... 201811188873.4

(51) Int. Cl.
  *G02B 7/02* (2021.01)
  *G02B 7/00* (2021.01)
  (Continued)

(52) U.S. Cl.
  CPC ............. *G02B 7/025* (2013.01); *G02B 7/003* (2013.01); *G02B 7/021* (2013.01); *G03B 17/12* (2013.01); *H04N 23/55* (2023.01)

(58) Field of Classification Search
  CPC ........ G02B 7/025; G02B 7/003; G02B 7/021; G02B 7/023; G02B 7/02; G02B 7/022;
  (Continued)

(56) References Cited

U.S. PATENT DOCUMENTS

2011/0116178 A1 5/2011 Lee
2014/0340771 A1 11/2014 Wakabayashi et al.
(Continued)

FOREIGN PATENT DOCUMENTS

CN 200956062 Y 10/2007
CN 101303442 A 11/2008
(Continued)

OTHER PUBLICATIONS

Extended European Search Report issued in corresponding European Application No. 19851081.0, dated Aug. 27, 2021, 6 pgs.
(Continued)

*Primary Examiner* — Jie Lei
(74) *Attorney, Agent, or Firm* — HAUPTMAN HAM, LLP (57) ABSTRACT

The optical lens includes: a first lens member including a first lens barrel and at least one first lens mounted in the first lens barrel; a second lens member including a second lens barrel and at least one second lens mounted in the second lens barrel, the at least one second lens together with the first lens forming an imaging optical system; and a first adhesive located in a first gap between the first lens member and the second lens member, the first adhesive supporting and fixing the first lens member and the second lens member after curing. A surface of the first lens barrel and/or a surface of the second lens barrel have at least one recess. The present disclosure also provides a corresponding camera module and assembly methods for the optical lens and the camera module.

10 Claims, 6 Drawing Sheets

(51) Int. Cl.
*G03B 17/12* (2021.01)
*H04N 5/225* (2006.01)
*H04N 23/55* (2023.01)

(58) Field of Classification Search
CPC .......... G02B 7/026; G02B 7/10; G02B 7/102;
G02B 7/006; G02B 7/09; G02B 7/14;
G03B 17/12; G03B 30/00; G03B 5/06;
G03B 3/02; G03B 3/10; G03B 17/14;
H04N 23/55; H04N 23/555; H04N 5/225;
H04N 5/2254; H04N 2005/2255
USPC ........ 359/811, 819, 821–823, 826, 694, 699,
359/700, 701, 704; 396/529, 530, 533,
396/535, 544
See application file for complete search history.

(56) References Cited

U.S. PATENT DOCUMENTS

| | | | |
|---|---|---|---|
| 2016/0006912 A1 | 1/2016 | Kim | |
| 2017/0123178 A1* | 5/2017 | Wang | G02B 7/025 |
| 2018/0059354 A1* | 3/2018 | Gutierrez | G02B 7/022 |

FOREIGN PATENT DOCUMENTS

| | | |
|---|---|---|
| CN | 101963692 A | 2/2011 |
| CN | 104570168 A | 4/2015 |
| CN | 104834074 A | 8/2015 |
| CN | 105445888 A | 3/2016 |
| CN | 105467550 A | 4/2016 |
| CN | 205594217 U | 9/2016 |
| CN | 206523671 U | 9/2017 |
| CN | 107255861 A | 10/2017 |
| CN | 207281367 U | 4/2018 |
| CN | 207336891 U | 5/2018 |
| CN | 207336902 U | 5/2018 |
| CN | 108398760 A | 8/2018 |
| JP | 2004209106 A | 7/2004 |
| JP | 2005183819 A | 7/2005 |
| KR | 20140076761 A | 6/2014 |
| WO | 2017052268 A2 | 3/2017 |

OTHER PUBLICATIONS

International Search Report issued in corresponding International Application No. PCT/CN2019/098180; mailed Sep. 30, 2019; State Intellectual Property Office of the P.R. China, Beijing, China, 8 pgs.

* cited by examiner

OPTICAL LENS, IMAGING MODULE AND ASSEMBLY METHOD THEREOF

CROSS-REFERENCE TO RELATED APPLICATIONS

The present patent application is a continuation of international Application No. PCT/CN2019/098180, filed on Jul. 29, 2019, which claims benefit of priorities to Chinese Patent Application No. 201810953772.5, entitled "Optical Lens, Camera Module, and Assembly Method Thereof", filed on Aug. 21, 2018 before the China National Intellectual Property Administration (CNIPA), and Chinese Patent Application No. 201811188873.4, entitled "Optical Lens and Camera Module", filed on Oct. 12, 2018 before the CNIPA. All of the aforementioned patent applications are hereby incorporated by reference in their entireties.

TECHNICAL FIELD

The present application relates to the technical field of optical imaging, and more particularly, to an optical lens, an image pickup module, and an assembly method thereof.

BACKGROUND

With the popularization of mobile electronic devices, the related technologies of camera modules applicable to mobile electronic devices and for assisting a user to acquire images (such as videos or images) have been rapidly developed and advanced. In recent years, the camera module has been widely used in many fields such as medical treatment, security, industrial production, and the like.

In order to meet the increasing market demand, high pixel, small size, and large aperture are irreversible development trends for the current camera modules. However, it is difficult to achieve high pixel, small size, and large aperture requirements in a same camera module. For example, the compactness requirements of the mobile phone and the increase in screen-to-body ratio have made the space inside the mobile phone available for the front camera module smaller and smaller. In addition, the market has put forward higher and higher demands for the imaging quality of camera modules.

In compact camera modules (for example, camera modules for mobile phones), a lens is an important part of the camera module and directly affects the imaging quality of the camera module. However, during production or use, the lens component may be in an extreme environment such as high temperature and high humidity. Environmental conditions such as high temperature and high humidity may cause expansion of the lens, and because the structure and composition of the upper and lower lens parts are different, deformations between the upper and lower lens parts are inconsistent, so that there is a large stress inside the lens, which may cause deformation of the lens parts.

SUMMARY

The present application provides a solution that overcomes at least one drawback of the prior art.

According to one aspect of the present application, there is provided an optical lens, which includes: a first lens member including a first lens barrel and at least one first lens mounted in the first lens barrel; a second lens member including a second lens barrel and at least one second lens mounted in the second lens barrel, the at least one second lens together with the first lens forming an imaging optical system; and a first adhesive located in a first gap between the first lens member and the second lens member, the first adhesive supporting and fixing the first lens member and the second lens member after curing. A surface of the first lens barrel and/or a surface of the second lens barrel have at least one recess.

According to an embodiment of the present application, the first adhesive is located between the first lens barrel and the second lens barrel such that a relative position of the first lens member and the second lens member is maintained at a relative position determined by active calibration.

According to an embodiment of the present application, a bottom surface of the recess is arc-shaped.

According to an embodiment of the present application, the first lens barrel has a first outer top surface and the recess is provided on the first outer top surface.

According to an embodiment of the present application, first lens barrel and the first lens are connected by a bonding glue, and the recess is provided in an area between the bonding glue and the first adhesive on the first outer top surface.

According to an embodiment of the present application, the first lens barrel has a first outer side surface, and the recess is provided on the first outer side surface.

According to an embodiment of the present application, the first lens barrel has a symmetry axis, and the recess is evenly distributed about the symmetry axis.

According to an embodiment of the present application, the first lens barrel has a first inner top surface and a second inner top surface, the first inner top surface is in contact with the first lens, the second inner top surface is not in contact with the first lens, and the recess is provided on the second inner top surface.

According to an embodiment of the present application, the first lens barrel has a first inner top surface and a first inner side surface in contact with the first lens, and the recess is provided at a junction of the first inner top surface and the first inner side surface.

According to an embodiment of the present application, the recess has a side surface and a bottom surface, and the side surface of the recess is perpendicular to the bottom surface of the recess.

According to an embodiment of the present application, the second lens barrel has an outer side surface, and the recess is provided on the outer side surface of the second lens barrel.

According to an embodiment of the present application, the recess is provided at a position on the outer side surface of the second lens barrel corresponding to one or more second lenses located at a front end.

According to one aspect of the present application, there is provided an optical lens, which includes: a first lens member including at least one first lens; a second lens member including a second lens barrel and at least one second lens mounted in the second lens barrel, the at least one second lens together with the at least one first lens forming an imaging optical system; and a first adhesive located in a first gap between the first lens member and the second lens member, the first adhesive supporting and fixing the first lens member and the second lens member after curing. A surface of the second lens bagel has at least one recess.

According to another aspect of the present application, there is provided a camera module including an optical lens according to any one of the above.

According to yet another aspect of the present application, there is provided an assembly method for an optical lens, which includes: 1) preparing a first lens member and a second lens member separated from each other, wherein the first lens member comprises a first lens barrel and at least one first lens mounted in the first lens barrel, and the second lens member comprises a second lens barrel and at least one second lens mounted in the second lens barrel; 2) pre-positioning the first lens member and the second lens member so that the at least one first lens and the at least one second lens together constitute an imaging optical system; 3) determining a relative position of the first lens member and the second lens member by performing active calibration according to a measured imaging result of the imaging optical system; and 4) bonding the first lens member and the second lens member to support and fix the relative position of the first lens member and the second lens member A surface of the first lens barrel and/or a surface of the second lens barrel have at least one recess.

According to an embodiment of the present application, the assembly method, between the step 3) and the step 4), further includes: 3') coating a first adhesive on a top surface of the second lens barrel.

According to an embodiment of the present application, the assembly method, between the step 1) and the step 2), further includes: 1') coating a first adhesive on a top surface of the second lens barrel.

According to still another aspect of the present application, there is provided an assembly method for a camera module, which includes: assembling an optical lens by using the assembly method for the optical lens described in any one of the above; and manufacturing the camera module based on the assembled optical lens.

According to one aspect of the present application, there is provided an optical lens, which includes: a plurality of lenses constituting an imaging optical system; and a lens barrel in which the plurality of lenses are mounted. An outer side surface f the lens barrel has a groove formed by an outward-inward recess, and the groove is located at a position corresponding to a part of the lenses of the plurality of lenses.

According to an embodiment of the present application, the groove is located at a position corresponding to a lens with the highest optical sensitivity among the plurality of lenses; or the plurality of lenses includes an optical sensitive lenses group consisting of at least two lenses, the optical sensitive lenses group has a higher optical sensitivity than other lenses or lens groups of the plurality of lenses, and the groove is located at a location corresponding to the optical sensitive lenses group.

According to an embodiment of the present application, the groove is located at a position corresponding to a first front lens of the plurality of lenses.

According to an embodiment of the present application, the plurality of lenses includes a front lens group consisting of at least two lenses located at a front end, and the groove is located at a location corresponding to the front lens group of the plurality of lenses.

According to an embodiment of the present application, the plurality of lenses includes at least one adjustable lens, and the groove is located at a position corresponding to the adjustable lens.

According to an embodiment of the present application, the groove is an annular groove surrounding the outer side of the part of the lenses.

According to an embodiment of the present application, a bottom surface of the groove is arc-shaped.

According to an embodiment of the present application, a width of the groove is larger than or equal to a thickness of a structural area of the first front lens, and the width of the groove is a dimension of the groove in a direction along an optical axis of the optical lens.

According to an embodiment of the present application, the groove includes an upper sidewall and a lower sidewall, the upper sidewall is higher than a top of a structural region of the front lens group, and the lower sidewall is lower than a bottom of the structural region of the front lens group.

According to an embodiment of the present application, the groove includes a plurality of arc-shaped sub-grooves, the plurality of arc-shaped sub-grooves forms an unclosed ring, and the plurality of arc-shaped sub-grooves surrounds the outer side of the part of the lenses.

According to an embodiment of the present application, the lens barrel includes: an adjustment channel adapted to allow an adjustment tool to pass through the lens barrel to adjust a position of the adjustable lens; and a glue filling channel adapted to allow a glue to be filled to fix the adjustable lens to the lens barrel.

According to an embodiment of the present application, the lens barrel includes an adjustment and glue filling channel adapted to allow the adjustment tool to pass through the lens barrel to adjust a position of the adjustable lens, and allow a glue to be filled to fix the adjustable lens to the lens barrel.

According to an embodiment of the present application, the adjustment channel has an adjustment channel inlet communicated with an outside, and the adjustment channel inlet is located on a top surface or a side surface of the lens barrel; and the glue filling channel has a glue filling channel inlet communicated with the outside, and the glue filling channel inlet is located on the top surface or the side surface of the lens barrel.

According to an embodiment of the present application, the adjustment and glue filling channel has a channel inlet communicated with an outside, and the channel inlet is located on a top surface or a side surface of the lens barrel.

According to an embodiment of the present application, an inner side surface of the lens barrel has a multi-stage step in which the plurality of lenses are successively embedded to form a lens group.

According to another aspect of the present application, there is also provided a camera module including an optical lens according to any one of the above.

Compared with the prior art, the present application has at least one of the following technical effects:
1. The application may reduce the deformation of the lens in extreme environments such as high temperature and high humidity.
2. The present application may reduce the deformation of the lens barrel in an extreme environment such as high temperature and high humidity while maintaining the structure stability of the lens, thereby reducing the influence on the lens and reducing the optical loss.
3. The present application may avoid stress concentration on the lens barrel by arranging a recess on the surface of the lens barrel of the lens member, thereby reducing deformation of the lens barrel in an extreme environment such as high temperature and high humidity.
4. In the present application, the deformation of the lens barrel in an extreme environment is reduced due to the recess, so that the stability of the lens provided inside the lens barrel is maintained, and the imaging performance of the optical system composed of the lens is kept stable.

BRIEF DESCRIPTION OF THE DRAWINGS

Exemplary embodiments are shown in reference to the accompanying drawings.

The embodiments and drawings disclosed herein are to be regarded as illustrative rather than restrictive.

DETAILED DESCRIPTION OF EMBODIMENTS

For a better understanding of the present disclosure, various aspects of the present disclosure will be described in more detail with reference to the accompanying drawings. It is to be understood that these detailed descriptions are merely illustrative of exemplary embodiments of the present disclosure and are not intended to limit the scope of the present disclosure in any way. Throughout the specification, like reference numerals refer to like elements. The expression "and/or" includes any and all combinations of one or more of the associated listed items.

It should be noted that, in this specification, the expressions of first, second, etc., are used solely to distinguish one feature from another feature, and do not denote any limitation on the feature. Thus, the first body discussed below may also be referred to as the second body without departing from the teachings of the present disclosure.

In the drawings, the thickness, size and shape of an object have been slightly exaggerated for ease of illustration. The drawings are by way of example only and not strictly to scale.

It is also to be understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. Furthermore, expressions such as "at least one of," when preceding a list of elements, modify the entire list of elements and do not modify the individual elements of the list. In addition, when describing the embodiments of the present application, the use of "may" means "one or more embodiments of the present application". Also, the term "exemplary" is intended to refer to an example or illustration.

As used herein, the terms "substantially," "about," and similar terms are used as terms of approximation and not as terms of degree, and are intended to account for the inherent deviations in measured or calculated values that would be recognized by those of ordinary skill in the art.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a, meaning that is consistent with their meaning in the context of the relevant art and/or the present specification, and should not be interpreted in an idealized or overly formal sense, unless expressly so defined herein.

It should be noted that the embodiments in the present disclosure and the features in the embodiments may be combined with each other without conflict. The present disclosure will now be described in detail with reference to the accompanying drawings and examples.

Figure 1:
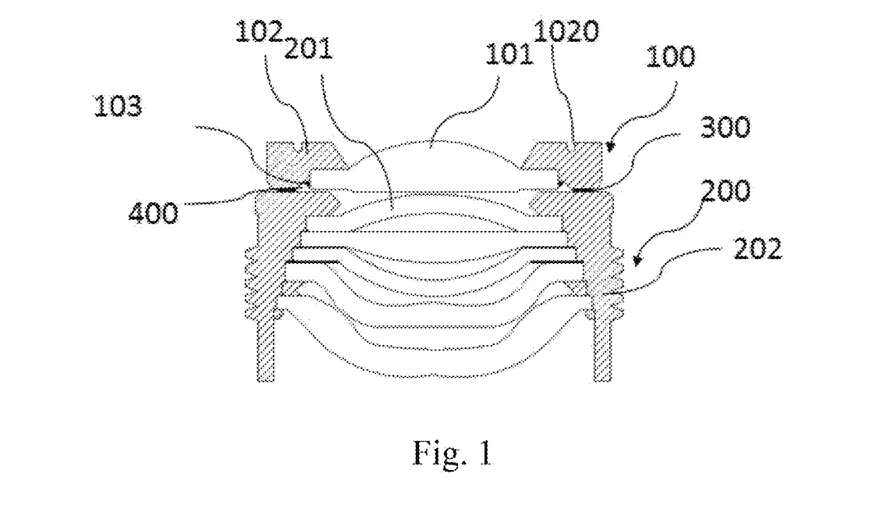
FIG. 1 shows a schematic cross-sectional view of an optical lens according to an embodiment of the present application.

FIG. 1 shows a schematic cross-sectional view of an optical lens according to one embodiment of the present application. The section is a section through the optical axis of the optical lens. In this embodiment, the optical lens includes a first lens member 100, a second lens member 200, and a first adhesive 300. The first lens member 100 includes a first lens barrel 102 and a first lens 101 mounted in the first lens barrel 102. The first lens barrel 102 and the first lens 101 are optionally connected by bonding glue 103. The second lens member 200 includes a second lens barrel 202 and five second lenses 201 mounted in the second lens barrel 202. The five second lenses 201 together with the first lens 101 constitute an imaging optical system. The first adhesive 300 is located in a first gap 400 between the first lens member 100 and the second lens member 200. The first adhesive 300 is adapted to support and fix the first lens 101 and the second lens member 200 after curing. The surface of the first lens barrel and/or the surface of the second lens barrel have at least one recess. In this embodiment, the first lens barrel 102 and the second lens barrel 202 are optionally connected by the first adhesive 300 to achieve the connection between the first lens member 100 and the second lens member 200. The first adhesive 300 may be adapted to support and fix the first lens barrel 102 and the second lens member 200 such that the relative positions of the first lens member 100 and the second lens member 200 are maintained at the relative positions determined by active calibration.

When the optical lens shown in FIG. 1 is in extreme environments such as high temperature and high humidity conditions, the expansion amounts of the various lens components are different, thereby causing the lens barrel to be pressed or stretched, generating a tensile stress or a compressive stress, so that the lens barrel is deformed. Since the lens is connected to the lens barrel, the deformation of the lens barrel further causes the lens to be displaced or deformed, which in turn causes the optical system to change, and thereby degrading the imaging quality of the optical lens.

Further, in one embodiment, the first lens member 100 includes at least one first lens 101, and the second lens member includes a second lens barrel and at least one second lens mounted in the second lens barrel. The at least one second lens and the at least one first lens together constitute an imaging optical system. A first adhesive is located in a first gap between the first lens member and the second lens member, and the first adhesive is adapted to support and fix the first lens member and the second lens member after curing. The surface of the second lens barrel has at least one recess.

Figure 2:
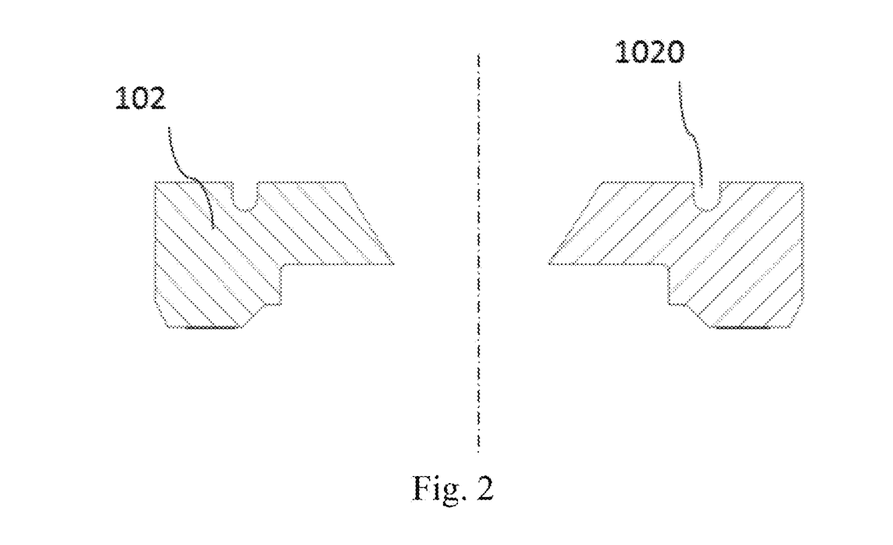
FIG. 2 shows a schematic cross-sectional view of a First lens barrel according to an embodiment of the present application.

Further, in one embodiment, the first lens barrel 102 has a symmetry axis about which the recess 1020 is evenly distributed. FIG. 2 shows a schematic cross-sectional view of a first lens barrel according to an embodiment of the present application. The section is a section through the symmetry axis of the first lens barrel. Referring to FIG. 2, the recess 1020 presents a notch shape in the cross-sectional view, and the notch formed by the recess 1020 is optionally symmetrical with respect to the symmetry axis of the first lens barrel, thereby forming an annular recess.

In practical application, it has been found that the first lens member is deformed by a large amount in an extreme environment, and therefore, in order to reduce the deformation of the optical lens in extreme environments (such as high temperature and high humidity conditions), the recess 1020 is provided on the surface of the first lens barrel 102 of the optical lens. When the first lens barrel 102 is subjected to a tensile stress or a compressive stress, the recess 1020 becomes a position where the stress is concentrated. The expansion and contraction of the recess 1020 reduces the influence of the stress on the first lens member, so that the position of the first lens of the first lens member relative to the other lenses is kept stable.

Figure 3:
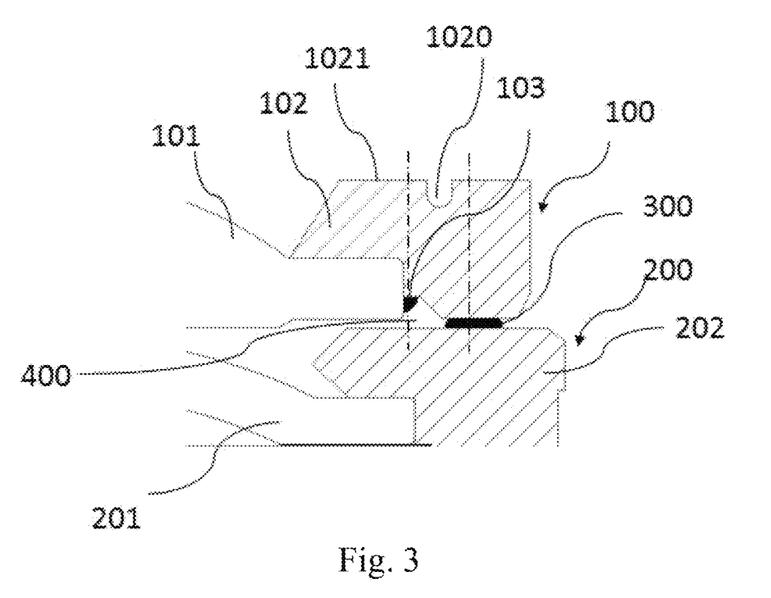
FIG. 3 shows a schematic partial cross-sectional view of an optical lens according to an embodiment of the present application.

FIG. 3 shows a schematic partial cross-sectional view of an optical lens according to an embodiment of the present application. The section is a section through the optical axis of the optical lens. In this embodiment, the recess 1020 is provided on the first outer top surface 1021 of the first lens barrel 102. In order to improve the deformation resistance of the recess 1020, the bottom portion of the recess 1020 is preferably provided in an arc shape. In this embodiment, the recess 1020 is preferably provided in an area (the position between the two dashed lines shown in FIG. 3) between the bonding glue 103 and the first adhesive 300 on the first outer top surface 1021. Since the position of the bonding glue 103 and position of the first adhesive 300 are the positions where the stress of the optical lens is concentrated, disposing the recess 1020 in the area between the bonding glue 103 and the first adhesive 300 on the first outer top surface 1021 can more effectively absorb the stress through the expansion and contraction of the recess, thereby reducing the influence of the stress on the first lens member and keeping the position of the first lens 101 of the first lens member 100 relative to the other lenses being stable.

Figure 4:
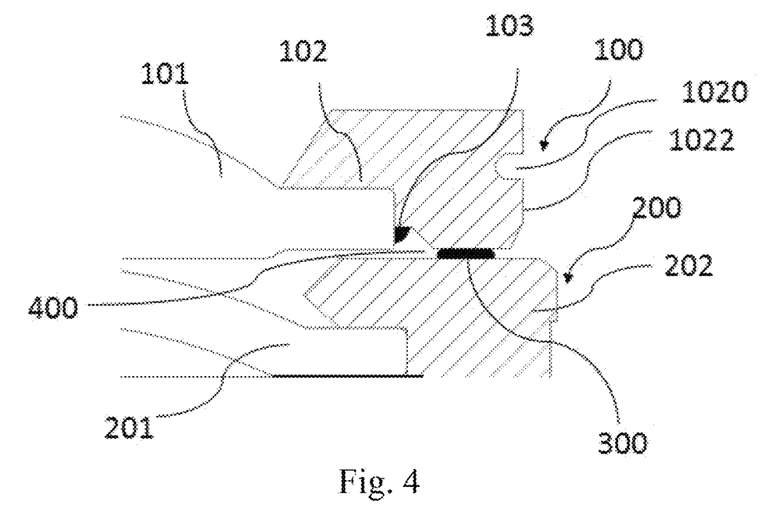
FIG. 4 shows a schematic partial cross-sectional view of an optical lens according to an embodiment of the present application.

Further, in one embodiment, a recess 1020 is provided on a first outer side surface 1022 of the first lens barrel 102. FIG. 4 shows a schematic partial cross-sectional view of an optical lens according to an embodiment of the present application. The section is a section through the optical axis of the optical lens. In this embodiment, the recess 1020 is provided on the first outer side surface 1022 of the first lens barrel 102. In FIG. 4, the recess 1020 is provided only on the first outer side surface 1022, but it is also possible for a person skilled in the art to provide the recess 1020 at other positions, for example, on the first outer top surface 1021, at the same time, so as to more effectively improve the stress absorption capacity.

Figure 5:
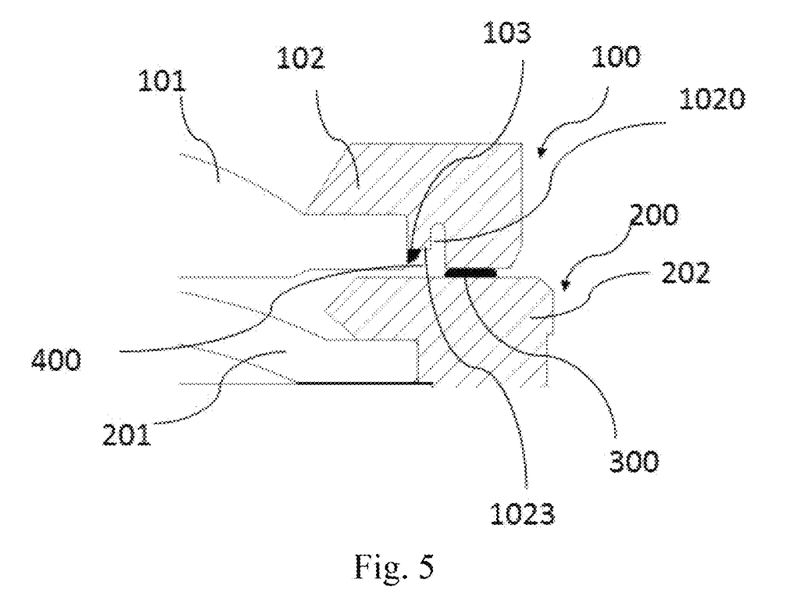
FIG. 5 shows a schematic partial cross-sectional view of an optical lens according to an embodiment of the present application.

Further, in one embodiment, a recess 1020 is provided on a second inner top surface 1023 of the first lens barrel 102. FIG. 5 shows a schematic partial cross-sectional view of an optical lens according to an embodiment of the present application. The section is a section through the optical axis of the optical lens. In this embodiment, the recess 1020 is provided on the second inner top surface 1023 of the first lens barrel 102. Referring to FIG. 5, the recess 1020 on the second inner top surface 1023 is located in an area between the bonding glue 103 and the first adhesive 300. The recess 1020 at such position can more effectively absorb the stress through the expansion and contraction of the recess, thereby reducing the influence of the stress on the first lens member and keeping the position of the first lens 101 of the first lens member 100 relative to the other lenses being stable.

Figure 6:
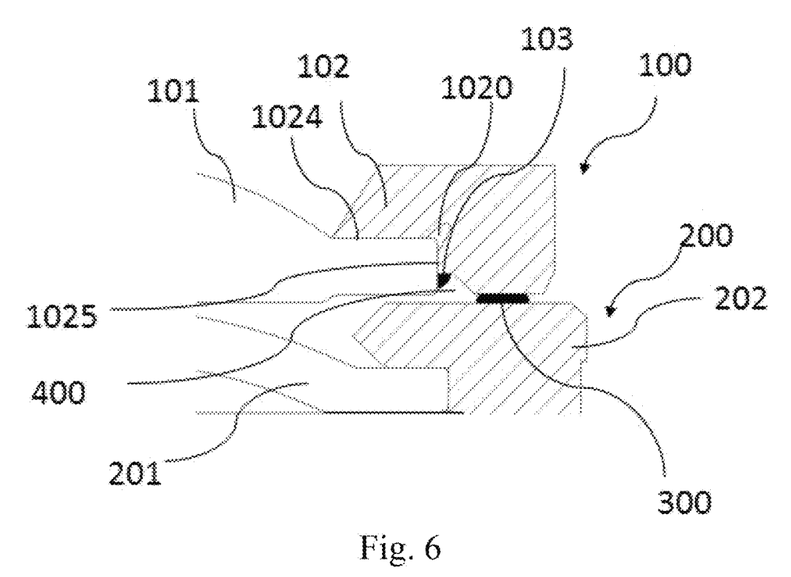
FIG. 6 shows a schematic partial cross-sectional view of an optical lens according to an embodiment of the present application.

Further, in one embodiment, a recess 1020 is provided at a junction of a first inner top surface 1024 and the first inner side surface 1025 of the first lens barrel 102. FIG. 6 shows a schematic partial cross-sectional view of an optical lens according to an embodiment of the present application. The section is a section through the optical axis of the optical lens. In this embodiment, the recess 1020 is provided at the junction of the first inner top surface 1024 and the first inner side surface 1025 of the first lens barrel 102. Referring to FIG. 6, the recess 1020 is located at the junction of the first inner top surface 1024 and the first inner side surface 1025 where the stress is more concentrated. The recess 1020 at such position can more effectively absorb the stress through the expansion and contraction of the recess, thereby reducing the influence of the stress on the first lens member and keeping the position of the first lens 101 of the first lens member 100 relative to the other lenses being stable.

Figure 7:
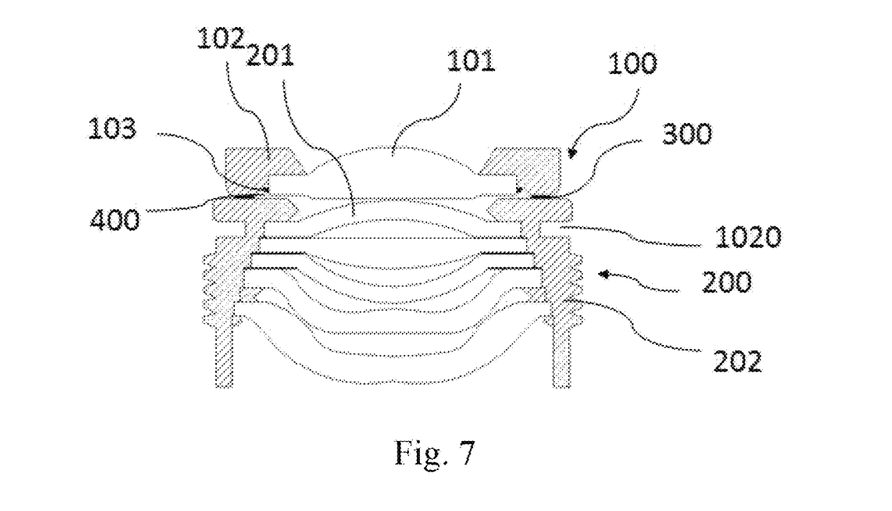
FIG. 7 shows a schematic cross-sectional view of an optical lens according to an embodiment of the present application.

Further, in one embodiment, a recess 1020 is provided on the outer side surface of the second lens barrel 202. The recess 1020 is located at a position corresponding to the second lens on the outer side surface of the second lens barrel 202. Preferably, the recess 1020 on the outer side surface of the second lens barrel 202 corresponds to a lens that has a greater impact on the optical system. For example, the second lens at the front end is generally relatively more sensitive, and therefore the recess 1020 may be provided at a position on the outer side surface of the second lens barrel 202 corresponding to a first second lens at the front end. In this context, the front end refers to the end near the object side of the optical lens. Of course, in other embodiments, the recess 1020 may be provided at a position on the outer side surface of the second lens barrel 202 corresponding to a plurality of second lenses at the front end. Further FIG. 7 shows a schematic cross-sectional view of an optical lens according to an embodiment of the present application. The section is a section through the optical axis of the optical lens. In this embodiment, the recess 1020 is provided on the outer side surface of the second lens barrel 202. Referring to FIG. 7, the recess 1020 is located on the outer side surface of the second lens barrel 202 corresponding to the second lens 201 where the stress is concentrated. The recess 1020 at such position can effectively absorb the stress through the expansion and contraction of the recess, thereby reducing the influence of the stress on the second lens member and keeping the position of the second lens 201 of the second lens member 200 relative to the other lenses being stable. In this embodiment, the recess 1020 has a side surface and a bottom surface, and the side surface of the recess is perpendicular to the bottom surface of the recess.

In the above embodiment, by providing the recess 1020 on the first outer top surface 1021, the first outer side surface 1022, second inner top surface 1023, or at the junction of the first inner top surface 1024 and the first inner side surface 1025, or on the outer side surface of the second lens barrel 202, respectively, it is possible to absorb the stress of the optical lens in an extreme environment, so that the position of the lens relative to the other lens is kept stable, thereby ensuring the imaging quality of the optical lens. The recess 1020 may be provided only on one surface of the lens barrel (the first lens barrel or the second lens barrel). Alternatively, a recess 1020 may be provided on each surface of the lens barrel at the same time. Alternatively, a plurality of recesses 1020 may be provided on one surface of the lens barrel. Alternatively, a plurality of recesses 1020 may be provided on each surface of the lens barrel at the same time.

Further, in another embodiment of the present disclosure, an imaging module based on the above-described optical lens is also provided. The camera module includes the optical lens and a photosensitive component. The optical lens may be an optical lens in any of the preceding embodiments.

According to an embodiment of the present disclosure, there is also provided an assembly method for an optical lens, including:

Step S10: Preparation step, A first lens member 100 and a second lens member 200 separated from each other are prepared. The first lens member 100 includes a first lens barrel 102 and at least one first lens 101 mounted in the first lens barrel 102. The second lens member 200 includes a second lens barrel 202 and at least one second lens 201 mounted in the second lens barrel 202.

Step S20: Pre-positioning step. The first lens member 100 and the second lens member 200 are pre-positioned so that the at least one first lens 101 and the at least one second lens 201 together constitute an imaging optical system.

Step S30: Active calibration step. The relative positions of the first lens member 100 and the second lens member 200 are determined by performing active calibration according to the measured imaging results of the optical system.

Step S40: Bonding step. The first lens member 100 and the second lens member 200 are bonded to support and fix the relative positions of the first lens member 100 and the second lens member 200. There is a non-zero angle α between the axis of the first lens member 100 and the axis of the second lens member 200.

In the above method, the surface of the first lens barrel and/or the surface of the second lens barrel have at least one recess.

Further, in one embodiment, between step S30 and step S40, further includes:

Step S30': a first adhesive is coated on a top surface of the second lens barrel 202.

Further, in one embodiment, between step S10 and step S20, further includes:

Step S10': a first adhesive is coated on a top surface of the second lens barrel 202.

Further, in another embodiment of the present disclosure, a method of assembling an imaging module based on the above-mentioned optical lens is also provided. The assembly method of the camera module includes assembling an optical lens and a photosensitive component. The method of assembling the optical lens may be the method of assembling the optical lens in any of the foregoing embodiments.

Figure 8A:
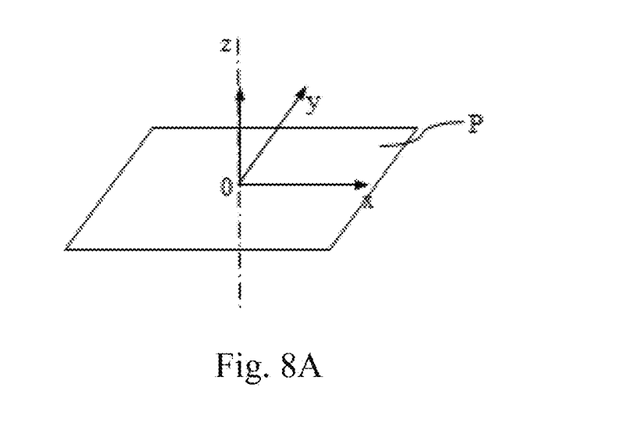
FIG. 8A shows an adjustment manner of relative position in active calibration in an embodiment of the present application.

Further, the active calibration described in the present disclosure may adjust the relative positions of the first lens member 100 and the second lens member 200 in a plurality of degrees of freedom. Active calibration refers to adjusting the position of one lens member relative to the other lens member to calibrate the entire optical system based on the measured image resolution of the optical system, so that the axis of each lens member is aligned and the measured image resolution of the optical system reaches a standard. FIG. 8A illustrates an adjustment manner of relative position in active calibration in an embodiment of the present disclosure. In this adjustment manner, the first lens member 100 is movable in the x, y, z directions with respect to the second lens member 200 (i.e., the relative position adjustment in this embodiment has three degrees of freedom). The z direction is the direction along the optical axis, and the x and y directions are the directions perpendicular to the optical axis. Each of the x and y directions lies in an adjustment plane P in which the translation can be decomposed into two components in the x and v directions.

Figure 8B:
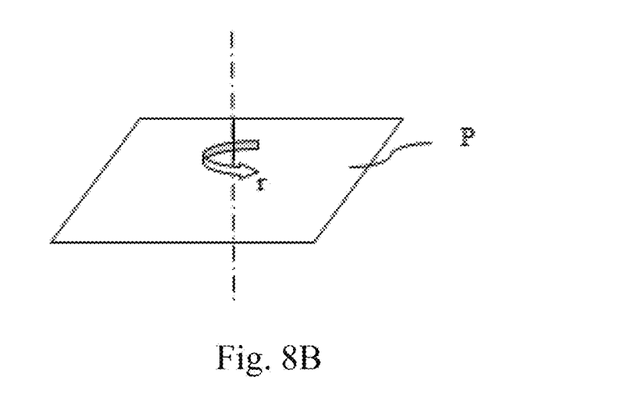
FIG. 8B shows a rotation adjustment in active calibration in another embodiment of the present application.

FIG. 8B illustrates rotation adjustment in active calibration according to another embodiment of the present disclosure. In this embodiment, in addition to the three degrees of freedom of FIG. 8A, the adjustment of relative position increases the degree of freedom of rotation, i.e., the adjustment in the r direction. In the present embodiment, the adjustment in the r direction refers to a rotation in the adjustment plane P, that is, a rotation about an axis perpendicular to the adjustment plane P.

Figure 8C:
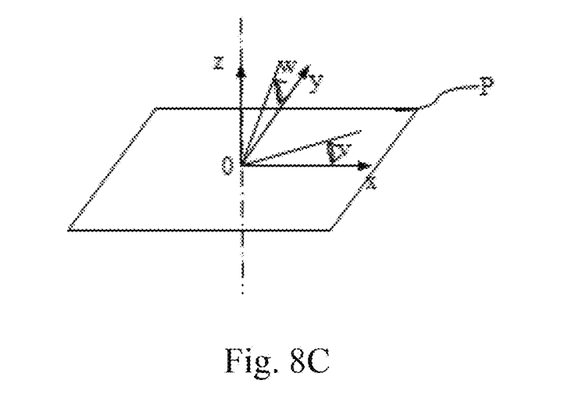
FIG. 8C shows an adjustment manner of relative position with v, w direction adjustment added in active calibration according to still another embodiment of the present application.

Further, FIG. 8C shows an adjustment manner of relative position with v, w directions adjustment added in active calibration according to still another embodiment of the present disclosure. The v direction represents the rotation angle in the xoz plane, and the w direction represents the rotation angle in the yoz plane. The rotation angles in the v direction and the w direction may be combined into a vector angle, which represents the total tilt state. That is, by adjusting in the v direction and the w direction, the tilt attitude of the first lens member 100 with respect to the second lens member 200 can be adjusted (i.e., the tilt of the optical axis of the first lens member 100 with respect to the optical axis of the second lens member 200).

The adjustment of the six degrees of freedom x, y, z, r, v, w may all affect the imaging quality of the optical system (e.g., the level of the resolution). In other embodiments of the present disclosure, the adjustment manner of the relative position may refer to adjusting only any one of the six degrees of freedom described above, or a combination of any two or more thereof.

Further, in one embodiment, in the active calibration step, the movement further includes a translation on the adjustment plane, i.e. a movement in the x and y directions.

Further, in one embodiment, the active calibration further includes adjusting and determining an angle of the axis of the first lens member 100 with respect to the axis of the second lens member 200, i.e., adjustment in the w and v directions, based on the measured image resolution of the optical system. In the assembled optical lens or camera module, the angle between the axis of the first lens member 100 and the axis of the second lens member 200 may be non-zero.

Further, in one embodiment, the active calibration further includes moving the first lens member 100 in a direction perpendicular to the adjustment plane (i.e., adjustment in the z direction), and determining a relative position between the first lens member 100 and the second lens member 200 in a direction perpendicular to the adjustment plane based on a measured image resolution of the optical system.

Further, in one embodiment, in the pre-positioning step, there is a gap between the bottom surface of the first lens member 100 and the top surface of the second lens member 200.

In one embodiment, in the active calibration step, the second lens member 200 may be fixed, and the first lens member 100 is clamped by a clamp. The first lens member 100 is moved under the actuation of the six-axis motion mechanism connected to the clamp, so that the relative movement between the first lens member 100 and the second lens member 200 in the above-mentioned six degrees of freedom is realized. The clamp may bear against or partially hear against the side surface of the first lens member 100, thereby clamping the first lens member 100.

In the above embodiment, by way of example, the optical lens is described as including a first lens member and a second lens member. However, the number of lens members in the optical lens is not specifically limited, that is, the number of lens members is not limited to two, and the number of lens members may be three or four, or the like, depending on a specific design requirement.

Figure 9:
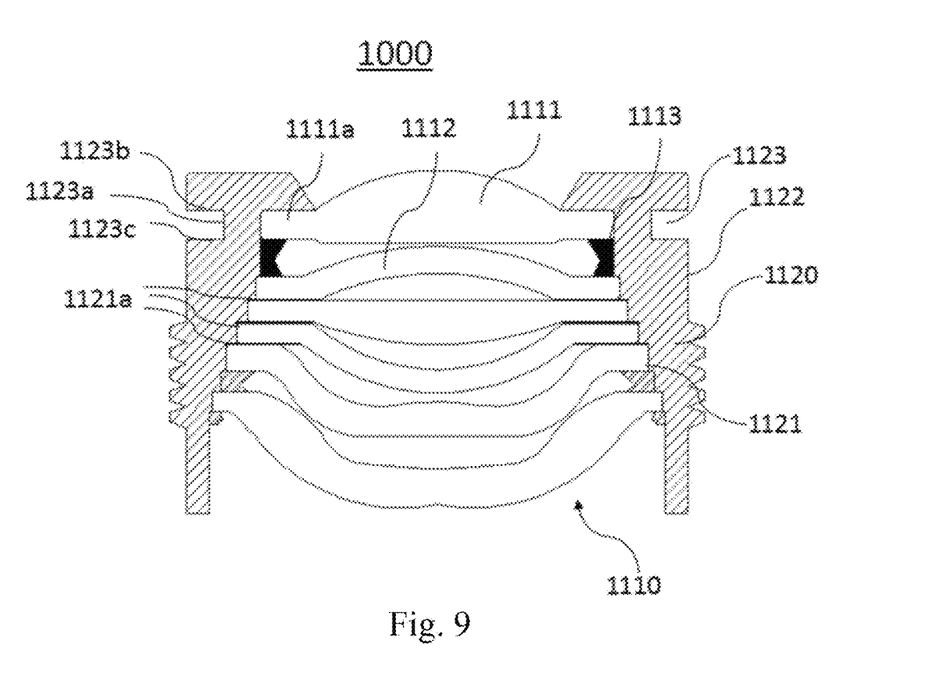
FIG. 9 shows a schematic cross-sectional view of an optical lens 1000 according to one embodiment of the present application.

FIG. 9 shows a schematic cross-sectional view of an optical lens 1000 according to an embodiment of the present application. As shown in FIG. 9, the optical lens 1000 of the present embodiment includes a plurality of lenses 1110 and a lens barrel 1120. The plurality of lenses 1110 constitute an imaging optical system, and the plurality of lenses 1110 are mounted inside the lens barrel 1120. The inner side surface 1121 of the lens barrel 1120 has a multi-stage step 1121a, and the plurality of lenses 1110 are successively embedded in the multi-stage step 1121a to form a lens group. The outer side surface 1122 of the lens barrel 1120 has a groove 1123 formed by an outward-inward recess, and the groove 1123 is located at a position corresponding to a part of the lenses of the plurality of lenses 1110. In this embodiment, the groove 1123 is located at a position corresponding to a first front lens 1111 of the plurality of lenses. The groove 1123 is an annular groove around the outside of the first front lens 1111. The width of the groove 1123 is slightly greater than or equal to the thickness of the structural region 1111a of the first front lens 1111. The width of the groove 1123 is a dimension of the groove 1123 in the direction along the optical axis of the optical lens 1000. In the present embodiment, the groove 1123 includes a bottom surface 1123a, an upper sidewall 1123b, and a lower sidewall 1123c. As used herein, each lens includes an optical region and a structural region. The optical region is the region in the lens for imaging, and the structural region surrounds the optical zone acting as a support (i.e., the function of a structural member). In this embodiment, a gasket 1113 is provided between the first front lens 1111 and the second lens 1112 to support the first front lens 1111 and the second lens 1112. The gasket 1113 may serve as an auxiliary support when a plurality of lenses is erected into a lens group, avoiding relative positional disturbances between the lenses.

In the prior art, when the lens is in extreme environments such as high temperature and high humidity conditions, the expansion amounts of the various lens components are different, thereby causing the lens barrel to be pressed or stretched, generating a tensile stress or a compressive stress, so that the lens is deformed. Since the lens is connected to the lens barrel, the deformation of the lens barrel further causes the lens to be displaced or deformed, which in turn causes the optical system to change, and thereby degrading the imaging quality of the optical lens. In the present embodiment, by providing a notch (i.e., a groove) on the lens barrel, the effect of changing the stress distribution of the lens under a high temperature and high-humidity environment is achieved, and the stability of the optical system of the lens under the extreme environment can be improved. At the same time, in the above-described embodiment, the side surface of the lens barrel is provided with a groove only at a partial position thereof, and the remaining portion of the lens barrel may have a sufficient thickness, thereby helping, to maintain the structure stability of the lens in a normal state (for example, in a non-high temperature and high humidity environment). Further, in the above-described embodiment, the optical sensitivity of the first front lens is relatively high, and a groove is provided on the outer side of this lens, so that the effect of improving the optical stability of the lens in an extreme environment is relatively good, while helping to maintain the structure stability of the lens in a normal state. It should be noted that the optical sensitivity of the lens is related to the optical design, and in other embodiments of the present application, the most optically sensitive lens is not necessarily the first front lens, for example it may also be the second lens, in which case the groove may be located at the corresponding position of the lens designed to be the most optically sensitive.

Further, in a preferred embodiment, a bottom surface of the groove 1123 may be arc-shaped. The arc-shaped bottom surface makes the stress distribution uniform, so as to better inhibit the displacement or deformation of the lens in a high-temperature and high-humidity environment.

Further, in another embodiment of the present application, the plurality of lenses includes a front lens group consisting of at least two lenses located at a front end, and the groove is located at a location corresponding to the front lens group of the plurality of lenses. In this embodiment, the groove corresponds to a plurality of lenses. The groove includes a bottom surface, an upper sidewall, and a lower sidewall. The upper sidewall is higher than the top of the structural region of the front lens group, and the lower sidewall is lower than the bottom of the structural region of the front lens group. In some optical designs, the multiple lenses at the front end have a strong optical sensitivity. Therefore, the groove in this embodiment extends the range of preventing lens displacement or deformation to a plurality of lenses. It should be noted that the optical sensitivity of the lens group is related to the optical design. In other embodiments of the present application, the most optically sensitive lens group is not necessarily the front lens group, and may be, for example, the lens group consisting of the second and third lenses, in which case the groove may be located at the corresponding position of lens group designed to be the most optically sensitive.

The optical sensitivity (sometimes also referred to as optical sensitivity degree) of a lens or a lens group can be judged by simulating the influence of the manufacturing tolerances and assembly tolerances of each lens on the lens MTF curve (or other curve characterizing the lens resolution). Sometimes the lens purchased on the market directly provides a sensitivity analysis table from which the optical sensitivity information of each lens can be directly obtained.

In the foregoing embodiments, the groove is a continuous annular groove. In yet other embodiments of the present application, the grooves may be discontinuous. For example, in one embodiment, the groove includes a plurality of arc-shaped sub-grooves. The plurality of arc-shaped sub-grooves forms an unclosed ring, and the plurality of arc-shaped sub-grooves surrounds the outside of a part of the lenses. Since the grooved area on the side surface of the lens barrel is reduced, the structure strength of the lens is better in the normal use state. In the extreme environment such as high temperature and high humidity, the non-closed annular groove can also produce a certain effect of improving the stress distribution, thereby improving the optical stability of the lens in the extreme environment.

Figure 10:
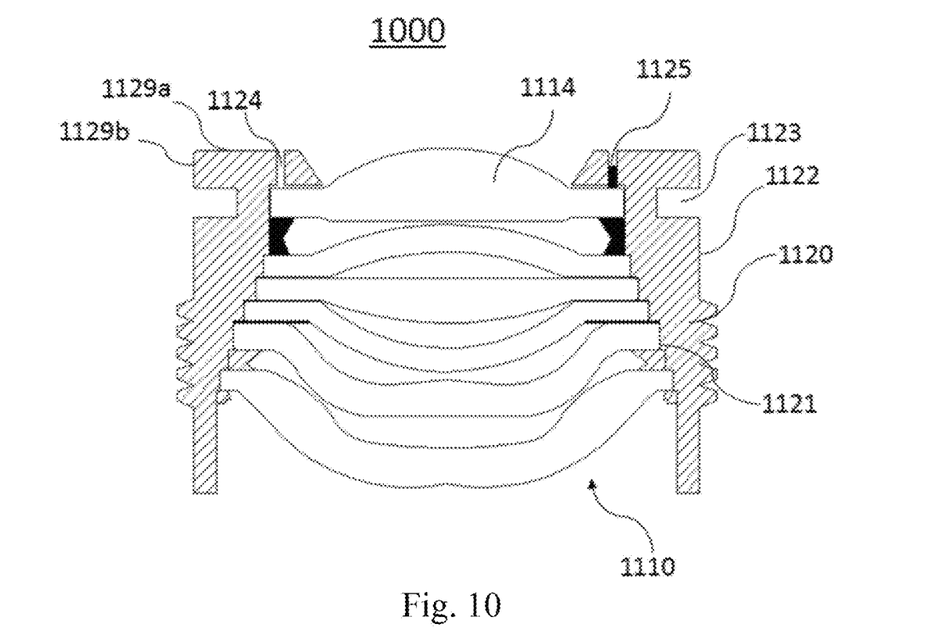
FIG. 10 shows an optical lens 1000 of another embodiment of the present application.

Further, FIG. 10 illustrates an optical lens 1000 according to another embodiment of the present application. The optical lens 1000 includes a plurality of lenses 1110 and a lens barrel 1120. The plurality of lenses 1110 are mounted inside the lens barrel 1120. The inner side surface 1121 of the lens barrel 1120 has a multi-stage step in which the plurality of lenses are successively embedded to form a lens group. The outer side surface 1122 of the lens barrel 1120 has a groove 1123 formed by an outward-inward recess, and the groove 1123 is located at a position corresponding to a part of the lenses of the plurality of lenses 1110. The plurality of lenses includes at least one adjustable lens 1114, and the groove 1123 is located at a position corresponding to the adjustable lens 1114. The lens barrel further includes an adjustment channel 1124 and a glue filling channel 1125. The adjustment channel 1124 is adapted to allow an adjustment tool to pass through the lens barrel to adjust the position of the adjustable lens 1114. The glue filling channel 1125 is adapted to allow glue to be filled to fix the adjustable lens 1114 to the lens barrel 1120. The adjustment channel may be parallel to the optical axis of the optical lens or may be inclined with respect to the optical axis of the optical lens. The glue filling channel may be parallel to the optical axis of the optical lens or may be inclined with respect to the optical axis of the optical lens. The adjustment channel has an adjustment channel inlet communicated with the outside, and the adjustment channel inlet is located on the top surface or the side surface of the lens barrel. The glue filling channel has a glue filling channel inlet communicated with the outside, and the glue filling channel inlet is located on the top surface 1129a or the side surface 1129b of the lens barrel. In an adjustable lens assembly, the adjustable lens is generally a lens that has a large influence on the imaging quality of the optical system (i.e., an optically sensitive lens), and the lens is fixed by the glue injected in the final step, so that the lens is relatively unstable. In an embodiment, a notch (i.e., a groove) may be provided around the adjustable lens to make the lens barrel (the lens barrel is usually black) around the adjustable lens relatively thin, which may improve the stress distribution in extreme environments such as high temperature and high humidity, and reduce the deformation amount of the lens barrel. In this way, the influence of extreme environments such as high temperature and high humidity on the adjustable lens is reduced, and the optical loss of the lens is reduced. Herein, "loss" mainly refers to the loss of optical properties, and also covers the deformation or displacement of the lens barrel and the lens due to stress.

Figure 11:
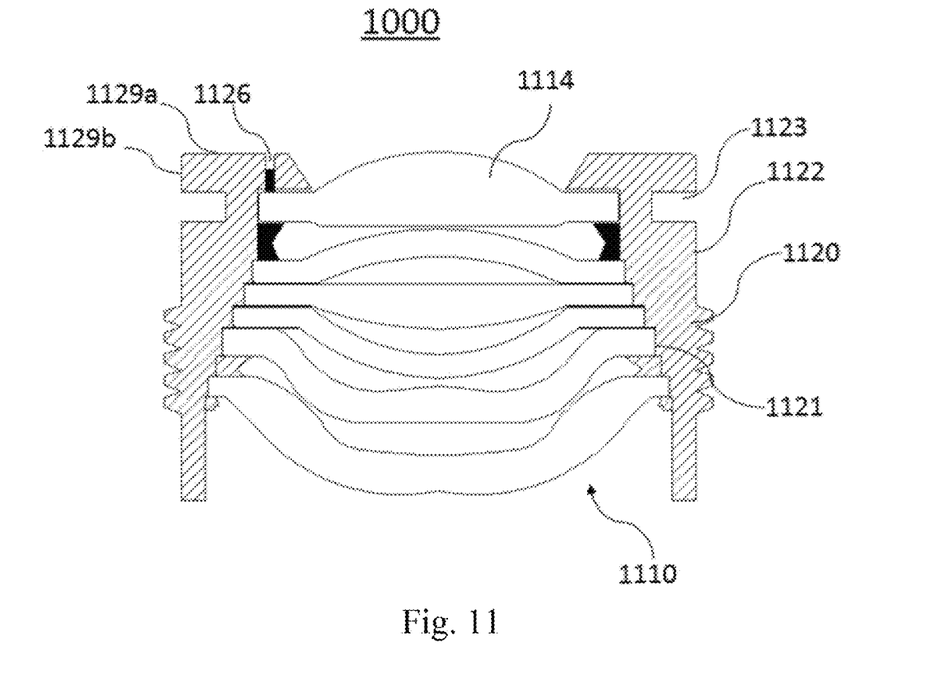
FIG. 11 shows an optical lens 1000 of another embodiment of the present application.

FIG. 11 illustrates an optical lens 1000 according to another embodiment of the present application. In the present embodiment, the lens barrel 1120 includes an adjustment and glue filling channel 1126, which is adapted to allow an adjustment tool pass through the lens barrel to adjust the position of the adjustable lens, and to allow glue to be filled to fix the adjustable lens to the lens barrel. In other words, in the present embodiment, the channels serving the adjustment function and the glue filling function are integrated, that is, the adjustment function and the glue filling function share the same physical channel. In a specific implementation, the adjustment tool may be passed through the lens barrel to adjust the position of the adjustable lens, and then the glue may be injected in to fix the adjustable lens to the lens barrel. The adjustment and glue filling channel has a channel inlet communicated with the outside, and the channel inlet may be located on the top surface 1129a or the side surface 1129b of the lens barrel.

Further, still referring to FIG. 9, in one embodiment, the lens barrel may be injection molded and the groove formed on the outer side surface of the lens barrel is molded in one shot based on the injection molding process.

In another embodiment, the groove may be formed on the outer side surface of the lens barrel by cutting the lens barrel, after the lens barrel is molded.

Further, the present application further provides a camera module corresponding to the optical lens. The camera module includes an optical lens, which may be the optical lens in any of the preceding embodiments. The camera module may be a fixed focus module, an automatic focus module (the automatic focus module has a motor), or an optical zoom module (the optical zoom module has at least two movable lens groups).

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical lens, comprising:
   a first lens member comprising a first lens barrel and at least one first lens mounted in the first lens barrel;
   a second lens member comprising a second lens barrel and at least one second lens mounted in the second lens barrel, the at least one second lens together with the at least one first lens forming an imaging optical system; and
   a first adhesive located in a first gap between the first lens member and the second lens member, the first adhesive supporting and fixing the first lens member and the second lens member after curing;
   wherein a surface of the first lens barrel and/or a surface of the second lens barrel have at least one recess to absorb stress inside the optical lens through expansion and/or contraction;
   wherein the first lens barrel has a first inner top surface and a second inner top surface, the first inner top surface is in contact with the first lens, the second inner top surface is not in contact with the first lens, and the recess is provided on the second inner top surface.

2. The optical lens according to claim 1, wherein the first adhesive is located between the first lens barrel and the second lens barrel such that a relative position of the first lens member and the second lens member is maintained at a relative position determined by active calibration.

3. The optical lens according to claim 1, wherein a bottom surface of the recess is arc-shaped.

4. The optical lens according to claim 1, wherein the first lens barrel has a first outer top surface, and the first lens barrel and the first lens are connected by a bonding glue, and wherein the recess is provided in an area between the bonding glue and the first adhesive on the first outer top surface.

5. The optical lens according to claim 1, wherein the first lens barrel has a first outer side surface, and the recess is provided on the first outer side surface.

6. The optical lens according to claim 1, wherein the first lens barrel has a symmetry axis, and the recess is evenly distributed about the symmetry axis.

7. The optical lens according to claim 1, wherein the first lens barrel has a first inner top surface and a first inner side surface in contact with the first lens, and the recess is provided at a junction of the first inner top surface and the first inner side surface.

8. The optical lens according to claim 1, wherein the recess has a side surface and a bottom surface, and the side surface of the recess is perpendicular to the bottom surface of the recess.

9. The optical lens according to claim 1, wherein the second lens barrel has an outer side surface, and the recess is provided at a position on the outer side surface of the second lens barrel corresponding to one or more second lenses located at a front end.

10. An assembly method for an optical lens, comprising:
1) preparing a first lens member and a second lens member separated from each other, wherein the first lens member comprises a first lens barrel and at least one first lens mounted in the first lens barrel, and the second lens member comprises a second lens barrel and at least one second lens mounted in the second lens barrel;
2) pre-positioning the first lens member and the second lens member so that the at least one first lens and the at least one second lens together constitute an imaging optical system;
3) determining a relative position of the first lens member and the second lens member by performing active calibration according to a measured imaging result of the imaging optical system; and
4) bonding the first lens member and the second lens member to support and fix the relative position of the first lens member and the second lens member;
wherein a surface of the first lens barrel and/or a surface of the second lens barrel have at least one recess to absorb stress inside the optical lens through expansion and/or contraction;
wherein the first lens barrel has a first inner top surface and a second inner top surface, the first inner top surface is in contact with the first lens, the second inner top surface is not in contact with the first lens, and the recess is provided on the second inner top surface.

* * * * *